United States Patent
Hadzhiyski et al.

(10) Patent No.: US 9,727,663 B2
(45) Date of Patent: Aug. 8, 2017

(54) DATA STORE QUERY PREDICTION

(71) Applicant: HEWLETT PACKARD ENTERPRISE DEVELOPMENT LP, Houston, TX (US)

(72) Inventors: Radi Dimitrov Hadzhiyski, Boeblingen (DE); Joern Schimmelpfeng, Herrenberg (DE)

(73) Assignee: EntIT Software LLC, Sunnyvale, CA (US)

( * ) Notice: Subject to any disclaimer, the term of this patent is extended or adjusted under 35 U.S.C. 154(b) by 156 days.

(21) Appl. No.: 14/266,336

(22) Filed: Apr. 30, 2014

(65) Prior Publication Data
US 2015/0317318 A1   Nov. 5, 2015

(51) Int. Cl.
*G06F 17/30* (2006.01)

(52) U.S. Cl.
CPC .... *G06F 17/30976* (2013.01); *G06F 17/3064* (2013.01); *G06F 17/30144* (2013.01); *G06F 17/30401* (2013.01); *G06F 17/30864* (2013.01); *G06F 17/30997* (2013.01)

(58) Field of Classification Search
CPC ......... G06F 17/30144; G06F 17/30401; G06F 17/30864; G06F 17/30997
USPC ....................................................... 707/752
See application file for complete search history.

(56) References Cited

U.S. PATENT DOCUMENTS

| | | | |
|---|---|---|---|
| 8,306,967 B2 | 11/2012 | Galitsky et al. | |
| 8,370,329 B2 | 2/2013 | Gutt et al. | |
| 8,510,328 B1 | 8/2013 | Hatton | |
| 8,639,679 B1* | 1/2014 | Zhou | G06F 17/3097 707/706 |
| 9,189,523 B2* | 11/2015 | Ganapathi | G06F 17/30469 |
| 9,235,654 B1* | 1/2016 | Gupta | G06F 17/3097 |
| 2006/0212433 A1* | 9/2006 | Stachowiak | G06F 17/271 |
| 2008/0071771 A1* | 3/2008 | Venkataraman | G06F 17/30713 |
| 2009/0037956 A1* | 2/2009 | Bennett | H04N 5/44543 725/44 |
| 2009/0043741 A1* | 2/2009 | Kim | G06F 17/3064 |
| 2010/0228376 A1* | 9/2010 | Stafford | G06Q 10/04 700/110 |
| 2010/0325145 A1* | 12/2010 | Hashimoto | G06F 17/3064 707/769 |
| 2011/0106614 A1* | 5/2011 | Ramer | G06F 17/30867 705/14.46 |
| 2012/0005542 A1* | 1/2012 | Petersen | G06F 11/0709 714/48 |
| 2012/0185507 A1 | 7/2012 | Paparizos et al. | |
| 2013/0035931 A1* | 2/2013 | Ferrucci | G06F 17/30976 704/9 |

(Continued)

OTHER PUBLICATIONS

Sumit Bhatia, et at., Query Suggestions in the Absence of Query Logs, Jul. 24-28, 2011, 10 pages.

(Continued)

*Primary Examiner* — Noosha Arjomandi

(57) ABSTRACT

Predicting a data store query can include receiving a portion of a natural language query including a first set of characters. Predicting a data store query can include generating, based at least in part on the first set of characters, a prediction of a phrase matching meta information associated with at least one of a service component metric, log, and event. Predicting a data store query can include proposing the prediction for completion of the query.

18 Claims, 4 Drawing Sheets

(56) References Cited

U.S. PATENT DOCUMENTS

| | | | |
|---|---|---|---|
| 2013/0041878 A1 | 2/2013 | Satyanarayana et al. | |
| 2013/0046777 A1 | 2/2013 | Mohiuddin et al. | |
| 2013/0262485 A1* | 10/2013 | Li | G06F 17/30241 |
| | | | 707/754 |
| 2015/0317355 A1* | 11/2015 | Schimmelpfeng | G06F 17/30864 |
| | | | 707/722 |
| 2016/0132787 A1* | 5/2016 | Drevo | G06N 99/005 |
| | | | 706/12 |

OTHER PUBLICATIONS

Kyle Hatlestad, Autocomplete for Metadata in Webcenter Content, Dec. 30, 2011, 4 pages.

Milad Shokouhi, et al., Learning to Personalize Query Auto-completion, Jul. 28-Aug. 1, 2013, 10 pages.

Beheshti, S-M. et al., "A Query Language for Analyzing Business Processes Execution," (Research Paper), Jun. 12, 2011, 16 pages, available at http://www.nicta.com.au/pub?doc=5107.

Rozsnyai, S. et al,, "SARI-SQL: Event Query Language for Event Analysis," (Research Paper), Dec. 15, 2009, 12 pages, available at http://publik.tuwien.ac.at/files/PubDat_179860.pdf.

Shan, D. et al., "EventSearch: A System for Event Discovery and Retrieval on Multi-Type Historical Data," (Research Paper), Aug. 2012, 4 pages, available at http://sewm.pku.edu.cn/project/HGJ-WDM/support_material/lxm/de1250-shan.pdf.

Wikipedia, "Facebook Graph Search," (Web Page), Jan. 27, 2017, 6 pages, available at https://en.wikipedia.org/wiki/Facebook_Graph_Search.

\* cited by examiner

DATA STORE QUERY PREDICTION

BACKGROUND

A data store can accommodate large volumes of data overtime. For example, a data store can store and index a wide variety of performance data associated with operations of a plurality of services. The performance data can be useful in identifying problems with the number of services.

DETAILED DESCRIPTION

Figure 1:
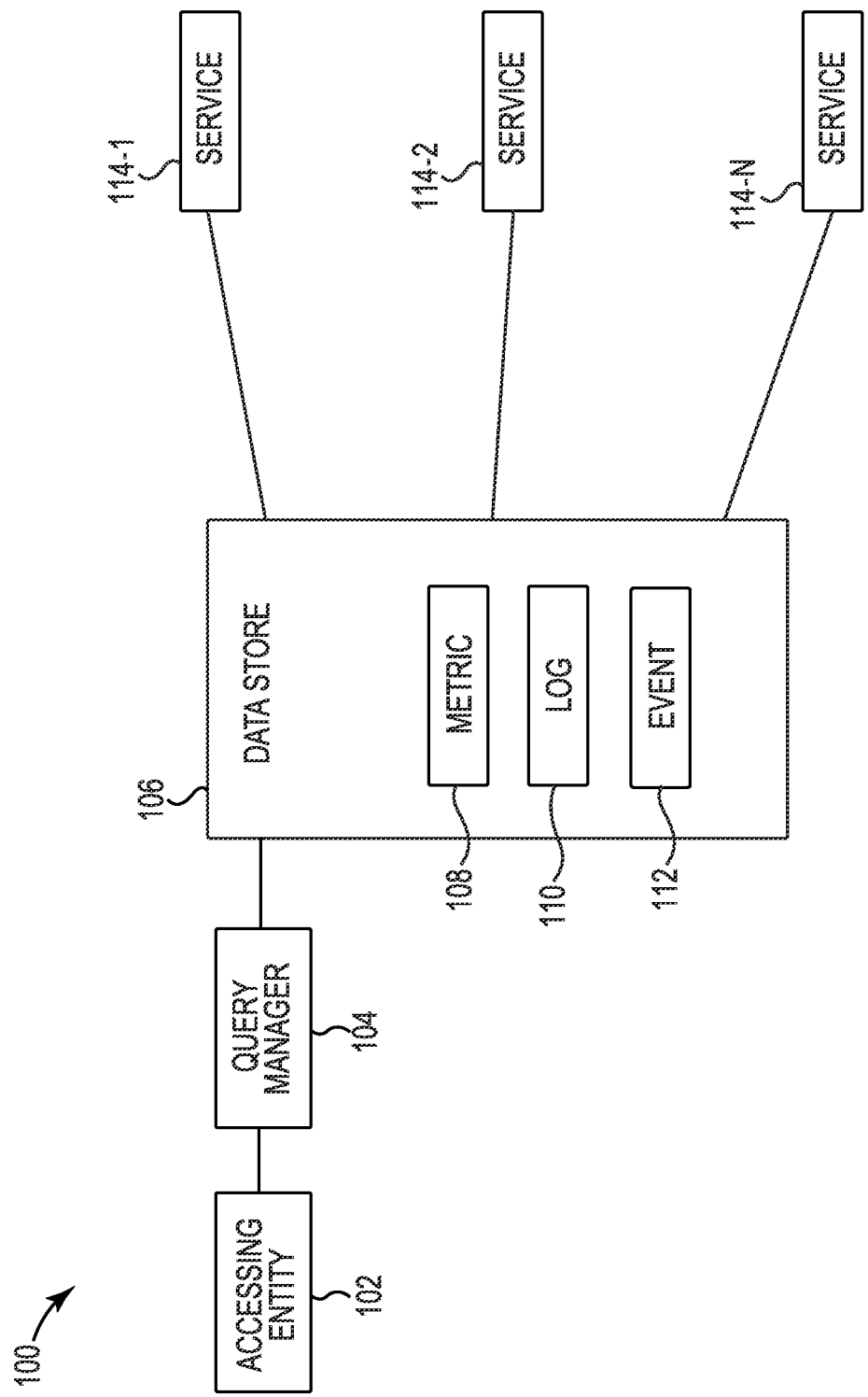
FIG. 1 illustrates an example environment for data store query prediction according to the present disclosure.

A data store can be a collection of data of diverse sources in diverse formats. As used herein, the term "data store" is meant to include a database, a database system (e.g., data, supporting data structures, database management systems), an XML file system, a data store area, a data source, and/or any organized or unorganized collection of data. A data store can be used to collect, store, and/or index data from diverse sources in diverse formats. The data can include data associated with the operation of a number of information technology (IT) services. For example, the data can include data associated with the performance of a plurality of services accessed by a computing device (e.g., by a user computing device) in a computing network.

A data store including data associated with operation of a plurality of services can be a resource for identifying root causes of problems with those services. In identifying these root causes it can be useful to have a holistic view of all of the services and their relationships. For example, a problem observed in a service is not necessarily the root cause of the problem. That is, the symptom (e.g., a failure of a business report to be generated) is not necessarily the disease (e.g., a problem in an exchange server serving the sales reporting service). The root cause can be removed from the service and unsuspected. Providing a holistic view of the performance and/or relationships of a plurality of services can be useful in revealing the root cause of a problem observed in a service.

Managing a plurality of services including an array of constituent service components arranged in a complex web of relationships across an organization can include collecting, storing, and indexing a large amount of data overtime. For example, a data store can collect, store, and/or index thousands of types of metrics, logs, and events for hundreds of thousands of services utilized by an organization.

Accessing a data store containing this data to identify the root cause of an observed problem can include investigating and analyzing the data store. In order to investigate and analyze a large amount of data, an accessing device (e.g., a user, a computing device, etc.) can benefit from having knowledge of all of the contents of the data store and the relationships between those contents (e.g., specific semantics, specific abbreviations, specific dependencies between service components, specific relationships between service components and services, etc.). However, the quantity of knowledge useful for fully utilizing the contents of a data store can present a practical limit to the useful amount of data collected, stored, and/or indexed by the database. That is, a given quantity of data can involve a certain quantity of knowledge in order to usefully access and analyze that data while a given accessing computing device (e.g., user) may possess a limited amount of knowledge. Further, the knowledge requirement can limit the usefulness of the data store across multiple users. For example, multiple users across an organization can have different roles with different knowledge bases and responsibility areas. It becomes increasingly unlikely with large volumes of data store content that any specific user possesses the knowledge required to access and analyze the full data store.

In contrast, the embodiments of the present disclosure describe a system, method, and computer readable medium for predicting a data store query to assist in the construction of the query.

FIG. 1 illustrates an example environment 100 for predicting a data store query. The environment 100 is shown to include a user 102, a query manager 104, a data store 106 including a metric 108, a log 110, an event 112, and services 114-1 . . . 114-N.

The environment can include an accessing entity (e.g., a user 102, a user computing device receiving input from a user 102, other computing devices executing instructions, a network of computing devices executing instructions, etc.) from which to receive a data store query. The data store query can be captured from the accessing device. While the examples given herein use the term user 102 for ease of reference in describing the accessing device, the embodiments are not so limited.

An accessing device can include a user 102. The user 102 can include any entity querying a data store 106. The user 102 can include an affiliate of an organization that uses and/or provides a number of services 114-1 . . . 114-N. For example, the user can include an information technology (IT) specialist affiliated with a large organization that uses and/or provides services. The user 102 can include a user computing device and/or an input device (e.g., keyboard, mouse, touchscreen, etc.). The user computing device can be associated with the user 102 and can be used to transmit/receive data related to querying a data store 106 to/from a query manager 104. For example, a user computing device can be used to transmit a data store querying to a query manager 104.

A user profile (not shown) can be associated with a user 102. The user profile can include information related to characteristics of the user 102. Characteristics of the user 102 can include the user's role within an organization, knowledge base, responsibility area, permissions, query history, etc.

The query manager 104 can be a data store management system including software, firmware and/or hardware for querying a data store 106. A query manager 104 can include instructions and/or commands for utilizing processing resources to perform a query of a data store 106. The query manager 104 can be stored on an accessing computing device, on the data store 106, and/or on a storage medium separate from the data store 106. The instructions of the query manager 104 can be executed by processing resources of an accessing computing device, by processing resources associated with the data store 106, and/or another processing resource. The query manager 104 can be a virtual appliance running on a virtual machine platform in a cloud system.

The query manager 104 can receive inputs and generate outputs (e.g., from/to the user 102, from/to the data store 106, from/to a data store 106 management system, from/to the service 114-1 . . . 114-N, etc.). For example the query manager 104 can receive a query of a data store 106. The query manager 104 can receive a query of a data store 106 from a user 102 as a completed query or in portions of a query. For example, the query manager 104 can incrementally receive a portion of a query made up of characters from a user 102 as the user 102 generates the query. The characters can be combined to form a phrase. The phrases can include one or more words or word parts. The query manager 104 can generate predictions to complete queries as discussed in further detail below.

The completed query and or portions of the completed query received by the query manager 104 can be phrased in a phrased query language (PQL). A PQL query can include a natural language formatted query. That is, rather than a query precisely formatted to include the specific semantics, abbreviations, and/or paths corresponding to the data in the data store 106 (e.g., a strict Boolean Search, etc.), the PQL query can be formatted to include linguistic phenomenon common in written and/or spoken language. For example, the PQL query can be phrased the way a user 102 would ask a friend or colleague a question during conservation.

The query manager 104 can resolve the query based on analysis of the phrases it is comprised of. Analyzing and resolving the query can include identifying phrases, portions of phrases, and/or semantic properties of the phrases/portions of phrases. In this manner, meaning can be attributed to the query.

Furthermore, the query manager 104 can identify data (e.g., metrics 108, logs 110, and events 112) of the data store 106 associated with at least one phrase in a query. The query manager 104 can identify the data of the data store 106 associated with at least one phrase by identifying data of the data store 106 that matches the phrase. Data of the data store 106 that matches the phrase can be data that includes or is associated with phrases that are identical to or similar to a portion of a phrase included in the query. For example, the data of the data store 106 can include and/or be associated with meta information. As used herein, the term meta information includes the contents of the data, names of the data, key attributes, relationships, and/or tags associated with the data. Therefore, data of the data store 106 can be identified as matching at least one phrase in the query when the meta information includes a phrase identical and/or similar to the a portion of a phrase in the query.

The data store 106 can include unstructured, semi-structured, and structured data. As used herein, the term unstructured data includes data lacking a strict data model structure. Unstructured data can include raw data that is not tagged, stored, processed, and/or organized according to a data model. As used herein, the term structured data includes data that is processed and organized according to a data model. Structured data can include tags and/or other markers identifying elements within the data. As used here, the term semi-structured data includes a type of structured data that lacks a strict data model structure but includes tags or other types of markers that are used to identify certain elements within the data. The data store 106 can be an operations management data store storing information related to a plurality of services 114-1 . . . 114-N. The data can include metrics (e.g., a service component metric associated with a constituent component of a service 114-1 . . . 114-N), a log 110 (e.g., a service component log associated with a constituent component of a service 114-1 . . . 114-N), and/or an event 112 (e.g., a service component event associated with a constituent component of a service 114-1 . . . 114-N). The services 114-1 . . . 114-N can be IT systems that provide an IT function. The services 114-1 . . . 114-N can be applications associated with a variety of aspects of an organization such as managing organization data for a portion of an organization (e.g., a sales department, an IT department, a business analytics group, etc.). The services 114-1 . . . 114-N can be software, hardware, and/or firmware deployed on a resource. For example, the services 114-1 . . . 114-N can be deployed on the data store 106, on an accessing computing device, on a cloud system, and/or on any other resource from which the data store 106 can receive the data. The services 114-1 . . . 114-N can be the data sources themselves. That is, the data store 106 can include the services 114-1 . . . 114-N. The services 114-1 . . . 114-N can be made up of and/or utilize a number of constituent service components (e.g., hosting servers, exchange servers, databases, CPUs, etc.). For example, a service 114-1 . . . 114-N can be a system that monitors a sales service for an organization. Such a service 114-1 . . . 114-N can include and/or utilize a specific sales database, a specific exchange server, and/or various other constituent service components.

The data store 106 can include data received from monitoring the services 114-1 . . . 114-N and their corresponding constituent components. Additionally, the data store 106 can include passively received data from the services 114-1 . . . 114-N. The services 114-1 . . . 114-N can additionally include monitoring and compiling applications that monitor the services 114-1 . . . 114-N and their corresponding constituent components and transmit the data to the data store 106. The data store 106 can receive the data in real time, near-real time, and or at intervals. The data store 106 can organize and index the data. The data store 106 can include the services 114-1 . . . 114-N as queryable data sources of the data store 106.

The data store 106 can be wholly or partially cloud based. For example, the data store 106 can include a public cloud system, a private cloud system, and/or a hybrid cloud system for storing, indexing, and/or organizing data. For example, an environment (e.g., IT environment) including a public cloud system and a private cloud system can include a hybrid environment and/or a hybrid cloud system. As used herein, the term public cloud system is intended to include a service provider that makes computational resources (e.g., applications, storage, virtual machines, and/or data), available to the public over the Internet. A public cloud system can be free or offered for a fee, for example.

As used herein, the term private cloud system is intended to include computing architecture that provides hosted services to a limited number of people behind a firewall. For example, a private cloud can include an Enterprise Resource Planning (ERP) system, a number of data stores, and virtualization (e.g., virtual machines). For instance, a private cloud system can include a computing architecture that provides hosted services to a limited number of a plurality of nodes (e.g., computers) behind a firewall. The ERP, for example, can integrate internal and external management information across an entire load test SaaS application, enterprise, and/or organization. A number of data store s can include an event data store, event archive, log data store, a metric data store, a semantics data store, a configuration management data store (CMDB), and/or a user profile/query history data store, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

As used herein, the term hybrid cloud is intended to include a mix of traditional server systems, private cloud systems, public cloud systems, and/or dynamic cloud services. For instance, a hybrid cloud can involve interdependencies between physically and logically separated services consisting of multiple systems. A hybrid cloud, for example, can include a number of clouds (e.g., two clouds) that can remain unique entities but can be bound together.

The data store 106 can include a metric 108 (e.g., a service component metric). As used herein, the term metric 108 is intended to include data related to the performance of a service 114-1 . . . 114-N such as a business metric, a market metric, a financial metric, a key performance indicator related to business, etc. The metric 108 can be data related to the performance (e.g., health, capacity, volume, input/output operations per second, transaction rates, available bandwidth, server downtime, etc.) of a service 114-1 . . . 114-N and/or its constituent service components. The metric 108 can include time series data including information about a service 114-1 . . . 114-N and/or its constituent service components. The metric 108 can be a type of metric 108 common to multiple services 114-1 . . . 114-N. That is, the data store 106 can store multiple metrics 108 of the same type for different services 114-1 . . . 114-N and/or service components, each individual metric 108 associated with a specific instance of a service component.

The data store 106 can include a log 110 (e.g., a service component log). The log 110 can be related to a service 114-1 . . . 114-N. The log 110 can be data related to the performance of a service 114-1 . . . 114-N and/or its constituent service components. The log 110 can include data including information about a service 114-1 . . . 114-N and/or its constituent service components. The log 110 can be associated with a specific instance of a service component. The log 110 can include a listing of particular actions that have occurred with respect to a service 114-1 . . . 114-N and/or its constituent service components. The log 110 can be a processed and logged event 112.

The data store 106 can include an event 112 (e.g., a service component event). As used herein, the term event is intended to include an action that has occurred with respect to a service 114-1 . . . 114-N and/or its constituent service components but that has not been processed and logged as a log 110. The event 112 can be related to a service 114-1 . . . 114-N. The event 112 can be data related to the performance of a service 114-1 . . . 114-N and/or its constituent service components. The event 112 can include data including information about a service 114-1 . . . 114-N and/or its constituent service components. The event 112 can be generated in response to an action occurring. For example, a service database can begin to experience a problem rendering it unavailable for use by the corresponding service 114-1 . . . 114-N. In response to detecting the problem, an event 112 can be generated indicating the service database is experiencing a problem.

The metric 108, log 110, and/or event 112 can each include meta information. The meta information can include a tag. A tag can include a tag phrase (e.g., characters, words, and/or word parts). The tag phrase can describe the service 114-1 . . . 114-N, the service component, the metric, the metric type, the log, the log type, the event, and/or the event type with which the particular metric 108, log 110, and/or event 112 is associated.

The metric 108, log 110, and/or event 112 can manually or automatically receive a tag. For example, when a new service 114-1 . . . 114-N is added as a data source for the data store 106 it can be registered. Registration can include designating a metric 108 (e.g., a service component metric associated with a constituent component of a service 114-1 . . . 114-N), a log 110 (e.g., a service component log associated with a constituent component of a service 114-1 . . . 114-N), and/or an event 112 (e.g., a service component event associated with a constituent component of a service 114-1 . . . 114-N) that will be associated with the service 114-1 . . . 114-N and how those metrics 108, logs 110, and/or events 112 should be tagged.

The meta information of the metric 108, log 110, and/or event 112 can additionally include a key attribute. A key attribute can include a phrase that identifies a specific instance and/or set of instances of a service component metric 108, service component log 110, and/or service component event 112. A key attribute can include a phrase that identifies a specific instance of a specific service component of a specific service 114-1 . . . 114-N associated with a particular metric 108, log 110, and/or event 112. For example, if a metric 108 for a particular service 114-1 . . . 114-N is called "disk_io_rate" then the tags for the metric 108 can be "disk" and "io" and the key attribute can be a particular host name (e.g., host_1) identifying the particular instance associated with the metric.

The query manager 104 can analyze a query as it is received and formulate identifications of a metric 108 (e.g., a service component metric associated with a constituent component of a service 114-1 . . . 114-N), a log 110 (e.g., a service component log associated with a constituent component of a service 114-1 . . . 114-N), and/or an event 112 (e.g., a service component event associated with a constituent component of a service 114-1 . . . 114-N) based on that analysis. Analyzing the query can further include generating predictions for completing and/or adding to a query. The predictions can be based at least in part on the received portion of the query.

For example, the query manager 104 can analyze an incrementally received portion of a natural language query of a data store 106 including a first set of characters. As used herein, the term natural language query is intended to include a type of query where linguistic phenomenon (e.g., verbs, phrases, clauses, etc.) common in written and/or spoken language are used to phrase a query the way a user would ask a friend or colleague a question during conservation. A set of characters can include one or more characters. Analyzing the first set characters can include matching the first set of characters to a phrase. Matching can include being wholly and/or partially identical to and/or similar to the phrase. The phrase can be a word and/or a word part that can be used as a descriptor and can be used to identify data (e.g., a metric 108, log 110, and/or an event 112) included in the data store 106. The phrase can be a phrase in a phrase catalog to which the query manager 104 has access. The phrase catalog can be an indexed array of phrases associated with a metric 108, log 110, and/or an event 112 in the database 106. The catalog of phrases can include the meta information of the metric 108, log 110, and/or an event 112 of the data store 106. The catalog of phrases may not be a separate pre-existing file or index. For example, the phrase catalog can be a matrix generated by an analysis of the metrics 108, logs 110, and/or events 112 of the data store 106 responsive to receiving the query.

Where the first set of characters comprises an incomplete phrase, the query manager 104 can utilize a predictive search algorithm to extrapolate additional characters (e.g., a second set of characters) that can be included in the query to complete the incomplete phrase. The extrapolation can be based on semantic knowledge of human communication and/or be limited to values within the catalog of phrases. For example, if the query manager 104 receives the character "d" as a first character, it can extrapolate that the remaining characters will include characters that when added to the first character will form a meaningful word and/or word part such as "does," "data," "database," etc. Further, the if the query manager 104 receives the first character "d" it can generate a prediction of a second set of characters (e.g., one or more characters that can coincide with the first set) (e.g., "atabase") that, when added to the first set of characters, comprise a completed phrase (e.g., "database") matching the meta information (e.g., the tag "database") associated with at least one of the metric 108, log 110, and/or an event 112 of the data store 106.

Where the first set of characters comprises a complete phrase, the query manager 104 can utilize a predictive search algorithm to extrapolate additional characters that will be included in the query to add a second complete phrase. The extrapolation can be based on phrase intersects (e.g., a set of phrases that are likely to appear in the same query based on the fact that metrics 108, logs 110, and/or an events 112 of the data store 106 are associated with both terms. For example, the query manager 104 can identify phrases matching the complete phrase of the first set of characters. The query manager 104 can identify metric 108, log 110, and/or an event 112 of the data store 106 that includes (e.g., within meta information) those phrases. The query manager 104 can then identify (e.g., within meta information) other phrases (e.g., intersecting phrases) associated with the same metric 108, log 110, and/or an event 112 of the data store 106. The query manager can generate a prediction of a second phrase to complete the query based on the other phrases associated with the same metric 108, log 110, and/or an event 112 of the data store 106.

Where the first set of characters comprises a complete first phrase and an incomplete second phrase, the query manager 104 can utilize a predictive search algorithm to extrapolate additional characters that will be included in the query to complete the incomplete second phrase. Again, this can be based on phrase intersects as described above. However, the query manager 104 can filter the prediction of the second phrase (in this case the second set of characters that, when added to the first set of characters, comprise the second phrase) to only those intersecting phrases associated with the same metric 108, log 110, and/or an event 112 in the data store 106 that also have a portion matching the incomplete second phrase present in the query.

The predictions for completing and/or adding to a query can be additionally based at least in part on the user profile. For example, the query manager 104 can analyze the user characteristics associated with the user profile of a particular user 102. Based on these characteristics the query manager 104 can generate predictions and/or filter predictions that are generated on other premises. For example, if the user profile includes a user characteristic defining the area of responsibility of the user as router configuration and/or revealing that the last one hundred queries by the user were related to router configuration, then the query manager 104 can generate and/or filter predictions such that the predicted phrases match meta information of router specific metrics 108, logs 110, and events 112.

The predictions for completing and/or adding to a query can also be based at least in part on query history. The query manager 104 can generate a prediction of a second set of characters, that when added to a first set of characters of a query, comprise at least one completed phrase that was present in a previous query. The previous query can be a previous query of a particular user and/or the previous query of a portion of users of the query manager 104. Each phrase that was present in a previous query can be associated with a frequency of appearance (e.g., how many times the phrase has appeared in a previous query, the proportion of previous searches that contained the phrase). Phrases with a higher frequency of appearance can by more likely predicted for completing and/or adding to a query.

The predictions for completing and/or adding to a query can be based at least in part on the relationships of metrics 108, logs 110, events 112, and services 114-1 ... 114-N. The query manager 104 can determine relationships based on a topological mapping stored in a semantics data store. A semantics data store can include data stored as triples (e.g., Object A, some relation, Object B) that describes how objects are linked together. For example, the semantics data store can be a configuration management database (CMDB). The query manager 104 can generate and/or filter predicted phrases based on the relationships linking the metrics 108, logs 110, events 112, and services 114-1 ... 114-N. The query manager 104 can generate and/or filter predicted phrases that match meta information associated with a metric 108, log 110, and/or an event 112 of the data store 106 that shares a relationship with a metrics 108, logs 110, events 112, and services 114-1 ... 114-N implicated (e.g., matching meta information of, etc.) in the received portion of the query. For example, if the first portion of the query is "what is going on with the florida sales" then the query manager 104 can generate and/or filter predicted phrases that match phrases associated with a metric 108, log 110, and/or an event 112 in the data store 106 that shares a relationship with a Florida sales service. If the Florida sales service has a relationship with a database and a server, the query manager 104 can predict "database," "server," and/or other phrases that will match meta information of the related database and server to complete the query.

The predictions for completing and/or adding to a query can additionally be based at least in part on keywords. Keywords can be phrases that add specificity to and/or narrow the query. A query can be phrased such that it produces a large amount of matching service component metrics 108, logs 110, and/or events 112, but keywords can narrow the matches to a more manageable amount in a directed manner.

Keywords can include key attributes. A key attribute can include a phrase that identifies a specific instance of a service component metric 108, log 110, and/or event 112. For example, a key attribute can include a phrase identifying a specific instance of a specific service component of a specific service associated with a specific metric 108, log 110, and/or event 112. For example, for a service component metric (e.g., metric 108) representing a measurement of a transaction rate for a specific database being utilized by a specific service (e.g., 114-1 ... 114-N), the key attribute can be a particular database name (e.g., "sales_database_1") identifying the particular instance associated with the metric 108.

Keywords can include key attribute indicating keywords. The key attribute indicating keyword can be "for." A phrase appearing after the key attribute indicating keyword can identify the key attribute. The key attribute can then be used to identify any service component metric 108, log 110, and/or event 112 with a matching key attribute. The query manager 104 can generate a phrase prediction including a key attribute indicating keyword and/or a key attribute. For example, the query manager 104 can predict a key attribute indicating keyword and/or a key attribute based on a user profile. For example, if the user profile includes a user characteristic defining the area of responsibility of the user 102 as router configuration and/or revealing that the last one hundred queried by the user 102 were related to router configuration, then the query manager 104 can predict a phrase including a key attribute indicating word and/or a key attribute to complete the query, wherein the key attribute indicating word and/or a key attribute match a key attribute of a service component metric 108, log 110, and/or event 112 that is specific to an instance of a router configuration metric 108, log 110, and/or event 112 associated with a router configuration service.

Keywords can include topological indicating keywords. A topological indicating keyword can include the phrase "show." A phrase and/or phrases immediately following the topology indicating keyword can be interpreted as a description of a service component type and the phrase and/or phrases immediately preceding the topology indicating keyword can be interpreted as a description of the service 114-1 . . . 114-N. The query manager 104 can generate a phrase prediction including the topological keyword. For example, if the first portion of the query is "what is going on with the florida sales" and the Florida sales service includes a database and a server, then the query manager 104 can generate predicted phrases including "show database" where the query manager 104 determines (e.g., based on user profile, based on query history, based on other phrases in the portion of the query, etc.) that the database is most likely what the user 102 is interested in.

The predictions for completing and/or adding to a query can additionally be based at least in part on data analytics of the data of the data store 106. Data analytics can include analyzing and/or modeling the data from the data store 106 to detect meaningful patterns. For example, the query manager 104 can identify potential malfunctions in services 114-1 . . . 114-N. The query manager 104 can accomplish this by identifying outlier metrics 108, logs 110, and/or events 112 in the data store 106 by outlier indicators (e.g., flags, irregular behavior, etc.). Outliers can be identified by comparing the metrics 108, logs 110, and/or events 112 of the data store 106 to corresponding models and/or standards. The models and/or standards can be predetermined and/or generated by the query manager 104. The predetermined standards can be the result of a learning period wherein the query manager 104 is exposed to the metrics 108, logs 110, and/or events 112 in the data store 106 over a period of normal function to establish a baseline standard for each. When the metrics 108, logs 110, and/or events 112 in the data store 106 exceed and/or fall below (e.g., by a percentage, for a period of time, etc.) the corresponding established baseline standard this can be considered an outlier indication. The query manager 104 can generate predictions and/or filter predictions that are generated on other premises such that phrases can be predicted for completing and/or adding to a query that match the meta information of metrics 108, logs 110, and/or events 112 associated with outlier indications.

The query manager 104 can generate a plurality of predicted phrases for completing and/or adding to a query. The plurality of predicted phrases can be generated in a variety of ways (e.g., those discussed above). The query manager 104 can sort the predicted plurality of phrases. For example, the query manager 104 can order the predicted plurality of phrases so that they are proposed in a specific order. This can include ordering the predicted plurality of phrases so that they appear as selectable options in a specific order in a drop down box from a search bar receiving the query. Those ordered to appear earlier in the sort can appear higher, or more proximate to the search bar, in the drop down box.

The query manager 104 can sort the predicted plurality of phrases based at least in part on the received portion of the query. For example, the query manager 104 can analyze an incrementally received portion of a natural language query of a database including a first set of characters. Analyzing the first set of characters can include matching the first set of characters to a phrase. Matching can include being wholly and/or partially identical to and/or similar to a phrase. The phrase can be a word and/or a word part that can be used as a descriptor and can be used to identify data (e.g., a metric 108, log 110, and/or an event 112) of the data store 106. The phrase can be a phrase in a phrase catalog to which the query manager 104 has access. The query manager 104 can utilize a predictive search algorithm to extrapolate additional characters that will be included in the query to complete the incomplete phrase. The query manager 104 can sort the predicted additional characters/phrases based on whether the combination of the first set of characters (e.g., one or more characters) and the second set of characters (e.g., one or more characters that can coincide with the first set) comprise a phrase that matches a phrase associated with (e.g., present in the meta information of, etc.) a metric 108, log 110, and/or an event 112 of the data store 106. For example, if the query manager 104 receives the character "d" as a first character, it can predict phrases such as "does," "data," "database," etc. While predicting "does" as a phrase could create a meaningful word, it can be that "data" and "database" are the only phrase prediction options that match phrases associated with a metric 108, log 110, and/or an event 112 of the data store 106. Accordingly, the query manager 104 can sort the predicted phrases so that "data" and "database" are ordered earlier in the sort than "does."

Additionally the query manager 104 can sort the plurality of predicted phrases based on the frequency with which they are present associated with a metric 108, log 110, and/or an event 112 of the data store 106. For example, continuing the "does" "data" "database" example, the query manager 104 can sort the predicted phrases so that "data" and "database" are ordered earlier in the sort than "does." Further, the query manager 104 can sort the predicted phrases so that "data" is ordered earlier in the sort than "database" because the phrase "data" is much more prevalently associated with a metric 108, log 110, and/or an event 112 in the data store 106 than the phrase "database."

Where the first set of characters comprises a complete phrase and/or a complete phrase and an incomplete phrase, the query manager 104 can utilize a predictive search algorithm to extrapolate additional characters that once included in the query complete a second phrase. The query manager 104 can, therefore, generate a plurality of such combinations resulting in a predicted plurality of phrases. The query manager 104 can sort the plurality of predicted phrases based on phrase intersects (e.g., a set of phrases that are likely to appear in the same query based on the fact that metrics 108, logs 110, and/or an events 112 in the data store 106 are associated with both terms). That is, the query manager 104 can sort the predicted phrases so that the phrases that intersect and/or intersect more frequently are ordered earlier in the sort than those that do not intersect and/or intersect less frequently.

The query manager 104 can sort the plurality of predicted phrases based on the user profile. For example, the query manager 104 can analyze the user characteristics associated with the user profile of a particular user 102. Based on these characteristics the query manager 104 can sort the plurality of predicted phrases. For example, if the user profile includes a user characteristic defining the area of responsibility of the user 102 as router configuration and/or revealing that the last one hundred queries by the user 102 were related to router configuration, then the query manager 104 can sort the predicted phrases so that the phrases that match and/or align with user characteristics are ordered earlier in the sort than those that do not.

The query manager 104 can sort the plurality of predicted phrases based on query history. The query manager 104 can sort the plurality of predicted phrases based on at least one completed phrase present in a previous query. The previous query can be a previous query of a particular user 102 and/or the previous query of a portion of users of the query manager 104. Each predicted phrase that was contained in a previous query can be associated with a frequency of appearance (e.g., how many times the phrase has appeared in a previous query, the proportion of previous searches that contained the phrase, etc.). Predicted phrases with a higher frequency of appearance can be ordered earlier in the sort than those appearing less frequently.

The query manager 104 can sort the plurality of predicted phrases based on data analytics (e.g., an outlier indication). For example, the query manager 104 can identify outlier metrics 108, logs 110, and/or events 112 in the data store 106 by outlier indicators (e.g., flags, irregular behavior, etc.). The query manager 104 can sort the plurality of predicted phrases such that metrics 108, logs 110, and/or events 112 associated with outlier indications are ordered earlier in the sort than those without outlier indications.

The query manager 104 can sort the plurality of predicted phrases based on the relationships of metrics 108, logs 110, events 112, and services 114-1 . . . 114-N. The query manager 104 can sort the plurality of predicted phrases based on the relationships linking the metrics 108, logs 110, events 112, and services 114-1 . . . 114-N. The query manager 104 can sort the plurality of predicted phrases such that the phrases matching meta information associated with a metric 108, log 110, and/or an event 112 in the data store 106 that shares a relationship with a metric 108, log 110, event 112, and/or service 114-1 . . . 114-N implicated in the received portion of the query are ordered to appear earlier in the sort and/or are order to appear near each other within the sort. For example, if the first portion of the query is "what is going on with the Florida sales" then the query manager 104 can predict "database," "server," "disk io," and/or "sales team" as phrases to complete the query. The query manager 104 can sort the predicted plurality of phrases so that phrases with a relationship (e.g., verified by cross-referencing a semantics data store (e.g., CMDB)) to the Florida sales service, for example "database" and/or "server" are order to appear earlier in the sort and/or are order with no intervening predicted phrases in the sort.

The query manager 104 can sort the plurality of predicted phrases based at least in part on keywords. Keywords can include key attributes. Keywords can include key attribute indicating keywords. The key attribute indicating keyword can be "for." The query manager 104 can sort the plurality of predicted phrases based on a key attribute indicating keyword and/or a key attribute. For example, where a key attribute indicating keyword and a key attribute are included in the received portion of the query, the query manager 104 can sort the plurality of predicted phrases such that the predicted phrases that match the meta information associated with the metrics 108, logs 110, and/or events 112 that include the key attribute and/or are related to the key attribute are ordered to appear earlier in the sort.

The query manager 104 can sort the plurality of predicted phrases based at least in part on keywords including topological indicating keywords. A topological indicating keyword can include the phrase "show." A phrase and/or phrases immediately following the topology indicating keyword can be interpreted as a description of a service component type and a phrase immediately preceding the topology indicating keyword can be interpreted as a description of the service 114-1 . . . 114-N. The query manager 104 can sort the plurality of predicted phrases such that the predicted phrases identify (e.g., matching phrases included in the associated meta information) metrics 108, logs 110, events 112 with a relationship to the service component types and or the service 114-1 . . . 114-N identified in the received portion of the query are order to appear earlier in the sort. For example, if the first portion of the query is "sales service for america show database" the query manager 104 can sort the plurality of predicted phrases such that those metrics 108, logs 110, events 112 with a relationship to the database of the sales service for America will be ordered to appear earlier in the sort.

The query manager 104 can propose the plurality of predicted phrases. The plurality of predicted phrases can be proposed to the user 102. The plurality of predicted phrases can be proposed by causing them to be displayed to the user 102 in a drop down box from a search bar receiving a query. The predicted phrases can be updated as the query manager 104 incrementally receives additional portions of the query. Accordingly, the updated predicted phrases can be proposed with each update.

The query manager 104 can propose the plurality of predicted phrases based on the sort. That is, the query manager 104 can propose the plurality of predicted phrases in an order determined by a sort. For example, ordering the predicted plurality of phrases so that they appear as selectable options in a specific order, determined by the sort, in a drop down box from a search bar receiving the query. Those ordered to appear earlier in the sort can appear higher, or more proximate to the search bar, in the drop down box.

The query manager 104 can receive a selection of the proposed predicted phrases. The user 102 may select one of the proposed predicted phrases from a drop down box and the query manager 104 can receive the selection. The user 102 can transmit the selection by selecting one of the proposed predicted phrases from a drop down box and/or by selecting a search initiating icon after selecting one of the proposed predicted phrases from a drop down box.

Upon receiving the selection, the query manager 104 can execute the query. The query manager 104 can execute the query by identifying a metric 108 (e.g., a service component metric associated with a constituent component of a service 114-1 . . . 114-N), a log 110 (e.g., a service component log associated with a constituent component of a service 114-1 . . . 114-N), and/or an event 112 (e.g., a service component event associated with a constituent component of a service 114-1 . . . 114-N) associated with a phrase included in the completed query. The query manager 104 can identify the metric 108, log 110, and/or event 112 associated with the phrase by identifying a metric 108, log 110, and/or event 112 with meta information (e.g., contents of the metric 108, log 110, and/or event 112; names of the metric 108, log 110, and/or event 112; relationships of the metric 108, log 110, and/or event 112; key attributes of the metric 108, log 110, and/or event 112; and/or tags associated with the metric 108, log 110, and/or event 112) including a phrase matching the phrase included in the completed query.

Where more than one phrase is present in the completed query of the data store 106, the query manager 104 can identify a metric 108, log 110, and/or event 112 associated with all or a portion of all phrases in the completed query. The query manager 104 can identify a metric 108, log 110, and/or event 112 with meta information matching all or a portion of all phrases in the completed query. For example, if the query includes the phrases "disk" and "io" then a metric 108 with meta information including the phrase "disk_io_rate" can be identified as matching the completed query phrases. The query manager 104 can also identify a second metric 108 with meta information including the phrase "disk_responsetime" since it matches the completed query phrase "disk." However, query manager 104 can identify the second metric 108 as a secondary (e.g., less relevant and/or less likely to satisfy the query than a metric matching more of the phrases in the query) metric for purposes of sorting the identified metric 108 for display. The query manager 104 can sort (e.g., order) a plurality of identified metrics 108, logs 110, and/or events 112 in this manner. For example, identified metrics 108, logs 110, and/or events 112 having corresponding meta information matching a greater amount of a plurality of phrases in the completed query can be ordered to appear earlier in the display.

The query manager 104 can additionally identify the metrics 108, logs 110, and/or events 112 associated with a phrases included in a completed query of a data store 106 based, at least in part, on relationships amongst the metrics 108, logs 110, and/or events 112. For example, a metric 108, log 110, and/or event 112 can be identified despite not themselves matching any and/or all of a plurality of phrases included in a completed query of a data store 106 if they are related to metrics 108, logs 110, and/or events 112 matching a plurality of phrases included in a completed query of a data store 106.

Additionally, the query manager 104 can identify the metrics 108, logs 110, and/or events 112 associated with a phrase included in a completed query of a data store 106 based, at least in part, on relationships between the metrics 108, logs 110, and/or events 112 and the services 114-1 . . . 114-N. For example, metrics 108, logs 110, and/or events 112 that are related to a service 114-1 . . . 114-N and/or its constituent service components matching a phrase included in a completed query of a data store 106 can be identified despite not themselves matching any and/or all of a phrase included in a completed query of a data store 106.

Identifying metrics 108, logs 110, and/or events 112 based on their relationships with one another and/or their relationships with a service 114-1 . . . 114-N and/or its constituent service components can include analyzing a topological mapping of the relationships stored in a semantics data store (e.g., a CMDB). The semantics data store (e.g., CMDB) can be part of the data store 106 or can be separate from the data store 106. The semantics data store (e.g., CMDB) can provide a topological mapping of the relationships of the metrics 108, logs 110, and/or events 112 with one another and/or their relationships with a service 114-1 . . . 114-N and/or its constituent service components based on a pre-definition of the relationships and/or analysis of their various dependencies.

The query manager 104 can sort a plurality of identified metrics 108, logs 110, and/or events 112 for display based on their relationships with one another and/or their relationships with a service 114-1 . . . 114-N and/or its constituent service components. For example, identified metrics 108, logs 110, and/or events 112 can match a phrase included in a completed query of a data store 106. The identified metrics 108, logs 110, and/or events 112 can have relationships with other metrics 108, logs 110, and/or events 112 that don't match the phrase or match fewer of a plurality of phrases. The query manager 104 can sort the related metrics 108, logs 110, and/or events 112 so that they are ordered to appear earlier in the display than they might otherwise if the sort were strictly based on the amount of matches to the phrases included in the completed query of a data store 106.

The query manager can further execute the query by causing the display of identified service component metric (e.g., metric 108), the identified service component log (e.g., log 110), and the identified service component event (e.g., event 112). Causing to display can include generating a display format for the identified service component metric, the identified service component log, and the identified service component event. Displaying can include transmitting the data to a display device (e.g., an electronic display device) capable of displaying the results of the query (e.g., the identified service component metric, the identified service component log, and the identified service component event) to a user 102. Displaying can include compiling and/or altering service component metrics, service component logs, and/or service component events. Displaying a service component metric can include displaying the service component metric as a time series chart. Displaying a service component log and/or a service component event can include displaying the service component log and/or a service component event as a table. Displaying can additionally include displaying the identified service component metric, the identified service component log, and/or the identified service component event along with a time filtering option to filter by a specified time window of interest such that only the identified service component metrics, the identified service component logs, and/or the identified service component events associated with that time period are displayed.

Figure 2:
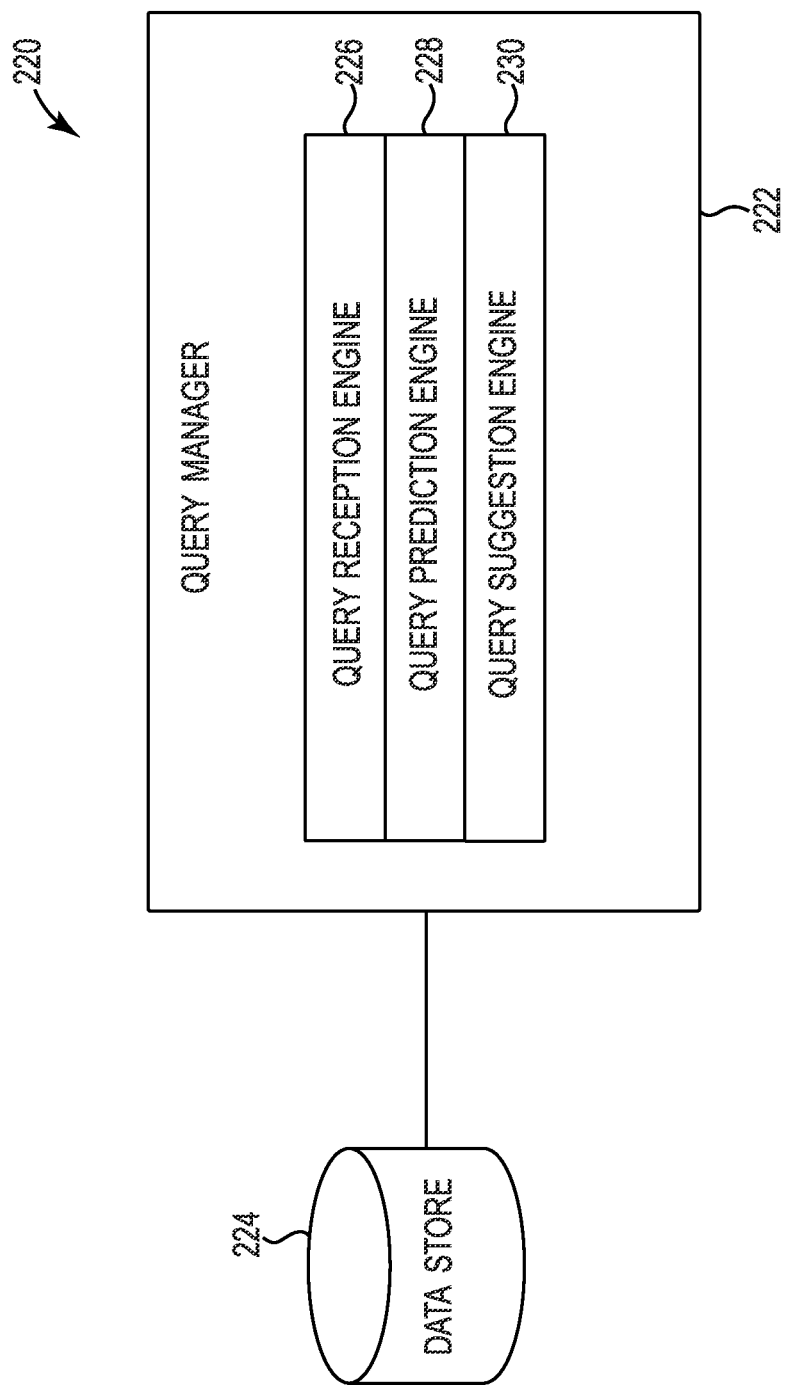
FIG. 2 illustrates a diagram of an example system for data store query prediction according to the present disclosure.

FIG. 2 illustrates a diagram of an example system 220 for data store query prediction according to the present disclosure. The system 220 can include a data store 224, a query manager 222, and/or a number of engines (e.g., the query reception engine 226, the query prediction engine 228, and the query suggestion engine 230). The query manager can be in communication with the data store 224 via a communication link, and can include, manage, and/or employ the number of engines (e.g., the query reception engine 226, the query prediction engine 228, and the query suggestion engine 230) to perform various functions. The query manager 222 can include additional or fewer engines than illustrated to perform the various functions described herein.

The number of engines (e.g., the query reception engine 226, the query prediction engine 228, and the query suggestion engine 230) can include hardware or a combination of hardware and programming, but at least hardware, to perform a number of functions described herein. For example, the query reception engine 226 can receive a portion of a natural language query of a data store including a first set of characters. The query prediction engine 228 can generate, based at least in part on the first set of characters, a prediction of a phrase matching meta information associated with at least one of a service component metric, a service component log, and a service component event. The query suggestion engine 230 can propose the prediction for completing the query. The programming can include program instructions (e.g., software, firmware, etc.) stored in a memory resource (e.g., computer readable medium, machine readable medium, etc.) as well as hard-wired program (e.g., logic).

The query reception engine 226 can receive a portion of a query. Receiving the portion of the query can include receiving the portion of the query from a user. The portion of the query can be in a natural language format. The portion of the query can include a first set of characters (e.g., one or more characters). The portion of the query can be received incrementally as it is entered by a user. The first set of characters can comprise an incomplete phrase, a completed first phrase, and/or a completed first phrase and an incomplete second phrase.

The query prediction engine 228 can generate, based at least in part on the first set of characters, a prediction of a phrase matching meta information associated with at least one of a service component metric, a service component log, and a service component event. In some embodiments, this can include generating a prediction of a phrase matching at least one of each of a service component metric, a service component log, and a service component event. The service component metric, the service component log, and the service component event can each include meta information. Meta information can include the contents of the metric, log, and/or event, names of the metric, log, and/or event, relationships of the metric, log, and/or event, key attributes of the metric, log, and/or event, and tags associated with the metric, log, and/or event.

A tag can include data, for example, in the form of a tag phrase. The tag phrase can include a description of a type of the service component and/or an identifier of a service component metric, log, and/or event. For example, the tag phrase can describe the service component and the metric represented by the service component metric, such as "database" and "transaction rate" for a service component metric representing a measurement of a transaction rate for a specific database being utilized by a specific service.

A key attribute can include a phrase that identifies a specific instance of a service component metric, log, and/or event. For example, a key attribute can include a phrase identifying a specific instance of a specific service component of a specific service associated with a specific metric, log, and/or event. For example, for a service component metric representing a measurement of a transaction rate for a specific database being utilized by a specific service, the key attribute can be a particular database name (e.g., "sales_database_1") identifying the particular instance associated with the metric.

A service component metric can include a measurement of the performance of a constituent component of a service. The service component metric can include time series data related to the performance of the service component. The service component metric can be specific to an instance of a service component. That is, while the metric itself may be of a type (e.g., a database transaction rate) that is common to many different service components and/or services, the individual service component metric may be specific to a particular instance of the service component (e.g., a database transaction rate for "sales database 1" used by "sales service A"). Therefore, while many service component metrics of the same type can be included in the data store, each service component metric can be unique to a specific instance of a service component.

A service component log can include log data related to an action of a constituent component of a service to which it is related. The service component log can be associated with a specific instance of a service component. The service component log can include a listing of particular actions that have occurred with respect to a service component. The service component log can be a processed and logged service component event.

A service component event can include event data related to an action of a constituent component of a service. The service component event can be associated with a specific instance of a service component. The service component event can be an action that has occurred with respect to a service component, but that has not been processed and logged as a log. The service component event can be generated in response to an action occurring. For example, a service database component of a service can begin to experience a problem rendering it unavailable for use by its associated service. In response to detecting the problem, a service component event can be generated indicating the service database is experiencing a problem.

Where the first set of characters of the portion of the query comprise an incomplete phrase, generating a prediction of a phrase can include generating a prediction of a second set (e.g., one or more characters) that, when combined with the first set of characters of the received portion of the query, comprise a completed phrase matching meta information associated with at least one of a service component metric, a service component log, and/or a service component event 112.

Where the first set of characters of the portion of the query comprise a completed first phrase and/or an incomplete second phrase, generating a prediction of a phrase can include generating a prediction of a second set (e.g., one or more characters) of characters that, when combined with the first set of characters of the received portion of the query, will complete the incomplete second phrase creating a completed first and/or second phrase matching meta information associated with at least one of a service component metric, a service component log, and/or a service component event. The completed first phrase can match meta information associated with at least one of a service component metric, a service component log, and/or a service component event.

Generating a prediction of a phrase can also include generating a prediction of a second set of characters that, when combined with the first set of characters comprise a completed phrase matching meta information associated with at least one of a service component metric, a service component log, and/or a service component event associated with an outlier indication. That is, the predictions for completing and/or adding to a query can be based at least in part on an outlier indication. A second set of characters that, when combined with the first set of characters comprise a completed phrase matching meta information of those service component metrics, a service component logs, and/or a service component events associated with an outlier indication can be predicted since an outlier indication can be indicative of a problem in the service. Accordingly, a query searching for the source of a problem with a service can be efficiently addressed by generating predictions that identify service component metrics, service component logs, and/or service component events that are experiencing problems.

Generating a prediction of a phrase can also include generating a prediction of a second set of characters that, when combined with the first set of characters comprise a completed phrase matching meta information associated with at least one of a service component metric, a service component log, and/or a service component event associated with a profile of a user (e.g., the user generating the query, the accessing entity, etc.). That is, the predictions of phrases for completing and/or adding to a query can be based at least in part on the user profile. Based on user characteristics included in the user profile the predictions can be generated. For example, if the user profile includes a user characteristic defining the area of responsibility of the user as router configuration and/or revealing that the last one hundred queries by the user were related to router configuration, then the generated predicted phrases can include a second set of characters that when combined with the first set comprise phrases that match meta information of at least one of a service component metric, a service component log, and/or a service component event associated with router configuration.

Generating a prediction of a phrase can also include generating a prediction of a second set of characters that, when combined with the first set of characters comprises a completed phrase matching a phrase that was contained in a previous query. The previous query can be a previous query of the same user generating the present query and/or a previous query of a plurality of users that have submitted queries.

The query suggestion engine 230 can propose the prediction for completing the query. Proposing the prediction can include proposing the prediction to the user. Proposing the prediction can include proposing predicted phrases to the user by causing them to be displayed to the user in a drop down box from a search bar receiving a query. The predicted phrases can be updated as the query manager incrementally receives additional portions of the query. Accordingly, the updated predicted phrases can be proposed with each update. The prediction can be proposed according to a sort.

Figure 3:
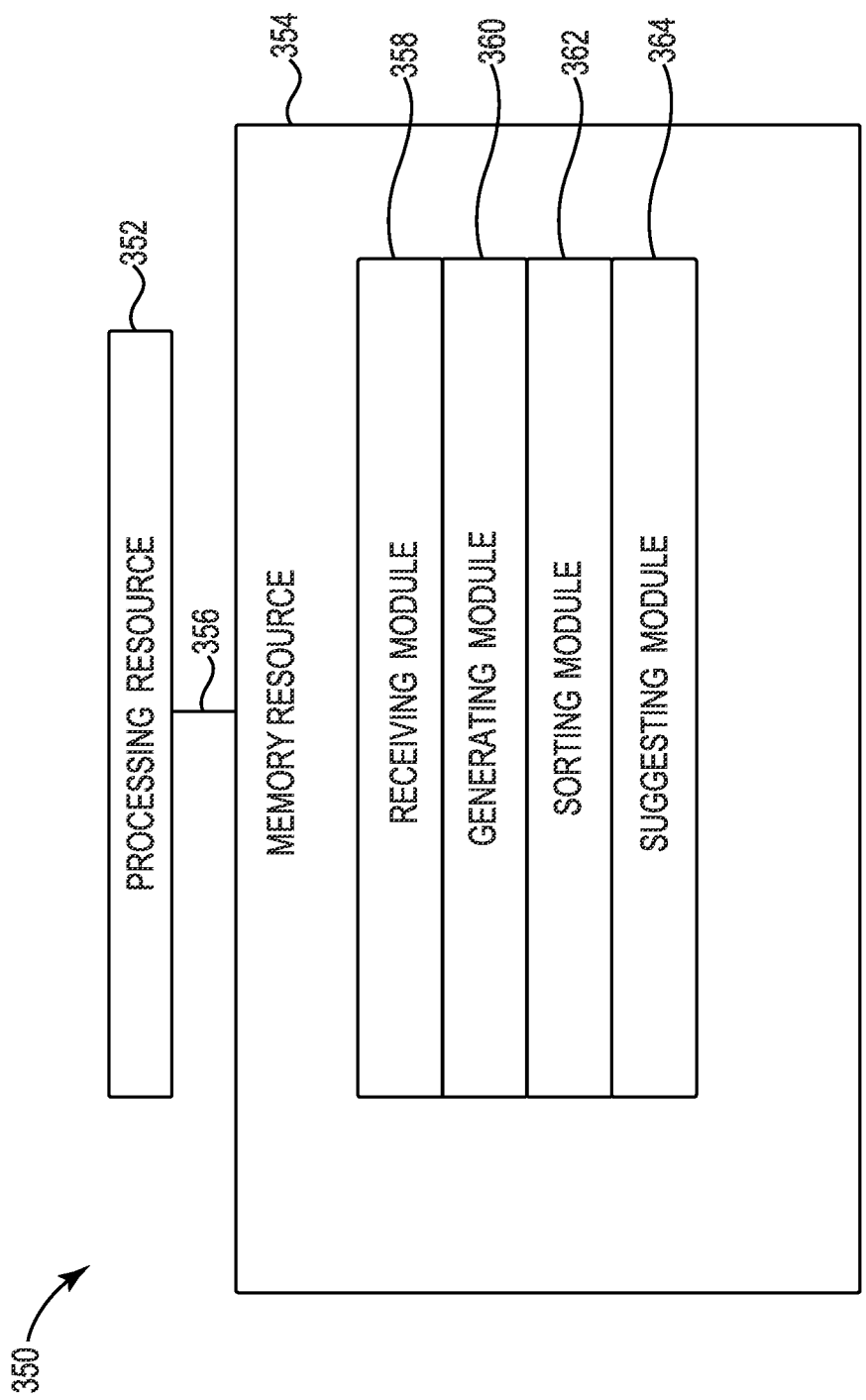
FIG. 3 illustrates a diagram of an example computing device according to the present disclosure.

FIG. 3 illustrates a diagram of an example of a computing device 350 according to the present disclosure. The computing device 350 can utilize software, hardware, firmware, and/or logic to perform a number of functions described herein. The computing device 350 can be any combination of hardware and program instructions to share information. The hardware, for example, can include a processing resource 352 and/or a memory resource 354 (e.g., computer-readable medium (CRM), machine readable medium (MRM), data store, etc.). A processing resource 352, as used herein, can include any number of processors capable of executing instructions stored by a memory resource 354. The processing resource 352 may be implemented in a single device or distributed across multiple devices. The program instructions (e.g., computer readable instructions (CRI)) can include instructions stored on the memory resource 354 and executable by the processing resource 352 to implement a desired function (e.g., receive a portion of a natural language query of a data store including a first set of characters, generate, based at least in part on the first set of characters, a prediction of a plurality of phrases identifying at least one of a service component metric, a service component log, and a service component event included in the data store, sort the predicted plurality of phrases, propose the sorted predicted plurality of phrases for completing the query, etc.).

The memory resource 354 can be in communication with a processing resource 352. A memory resource 354, as used herein, can include any number of memory components capable of storing instructions that can be executed by the processing resource 352. The memory resource 354 can be a non-transitory CRM or MRM. The memory resource 354 may be integrated in a single device or distributed across multiple devices. Further, the memory resource 354 may be fully or partially integrated in the same device as the processing resource 352 or it may be separate but accessible to that device and the processing resource 352. Thus, it is noted that the computing device 350 may be implemented on a participant device (e.g., host), on a server device, on a collection of server devices, and/or a combination of the participant device and the server device.

The memory resource 354 can be in communication with the processing resource 352 via a communication link (e.g., a path) 356. The communication link 356 can be local or remote to a machine (e.g., a computing device) associated with the processing resource 352. Examples of a local communication link 356 can include an electronic bus internal to a machine (e.g., a computing device) where the memory resource 354 is one of volatile, non-volatile, fixed, and/or removable storage medium in communication with the processing resource 352 via the electronic bus.

FIG. 3 includes a number of modules (e.g., receiving module 358, generating module 360, sorting module 362, suggesting module 364, etc.) that can include CRI that when executed by the processing resource 352 can perform a number of functions. The number of modules can be combined or can be sub-modules of other modules. For example, the generating module 360 and the sorting module 362 can be sub-modules and/or contained on the same computing device. In another example, the number of modules can comprise individual modules located on separate and distinct memory resources (e.g., CRM, etc.).

Each of the number of modules can include hardware, logic, software and hardware, but at least can include instructions that when executed by the processing resource 352 can function as a corresponding engine, including those as described herein. For example, the receiving module 358 can include instructions that when executed by the processing resource 352 can function as the query reception engine 226. The generating module 360 can include instructions that when executed by the processing resource 352 can function as the query prediction engine 228. The sorting module 362 and/or the suggesting module 364 can include instructions that when executed by the processing resource 352 can function as the query suggestion engine 230.

The receiving module 358 can include CRI that when executed by the processing resource 352 can receive a portion of a natural language query of a data store including a first set of characters (e.g., one or more characters). The characters can be incrementally received and analyzed to identify phrases and/or phrase parts.

The generating module 360 can include CRI that when executed by the processing resource 352 can generate, based at least in part on the first set of characters, a prediction of a plurality of phrases identifying at least one of a service component metric, a service component log, and/or a service component included in the data store. The prediction can include a second set of characters (e.g., one or more characters that can coincide with the first set) that, when combined with the first set, comprise at least one phrase identifying at least one of a service component metric, a service component log, and/or a service component included in the data store. Generating a prediction of a plurality of phrases identifying at least one of a service component metric, a service component log, and/or a service component included in the data store can additionally include generating the prediction based on a completed phrase in the portion of the query, a user profile, a query history, relationships, keywords, and/or outliers.

The sorting module 362 can include CRI that when executed by the processing resource 352 can sort the predicted plurality of phrases. Sorting can include ordering the predicted plurality of phrases. Ordering can include placing each of the plurality of predicted phrases in an order which they will appear as selectable options. Ordering can include arranging predicted phrases that are more likely to satisfy the query earlier in the sort. Those ordered earlier in the sort can appear within a drop down box at a position higher and/or more proximate to a search bar.

Sorting can include ordering a predicted phrase that identifies (e.g., matches meta information of, includes a key attribute of, contains a description implicating, etc.) at least one of a service component metric, a service component log, and/or a service component event associated with an outlier to appear earlier (e.g., first) in the sort. That is, a predicted second set of characters that, when combined with a first set of characters of a portion of a query, will comprise a completed predicted phrase that will match meta information associated with a service component metric, log, and/or event that has an outlier associated with it can be given a preferential ordering (e.g., ordered to appear earlier in the sort) over other predicted phrases of the plurality of phrases that are not associated with outliers.

Sorting can include ordering a predicted phrase that identifies at least one of a service component metric, a service component log, and/or a service component event related to a service identified by a portion of the query to appear earlier in the sort (e.g., first). That is, the ordering can be based on relationships amongst the service component metrics, service component logs, service component events, and/or the services. For example, the predicted second set of characters that, when combined with the first set of characters of a portion of a query, comprise a completed predicted phrase that will match the meta information for a service component metric, service component log, and/or service component event that shares a relationship with a service with meta information matching the first set of characters can be ordered to appear earlier in the sort. The relationships can be determined by referencing a topological mapping stored in a semantics data store (e.g., CMDB). The ordering can be based on an identification of a service component metric type and a service included in the query, wherein the identification is based on the structure of the query and the phrases contained therein with relation to a topological indicating keyword.

Sorting can additionally include ordering a predicted phrase that identifies at least one of a service component metric, a service component log, and/or a service component event appearing most frequently in previous queries to appear earlier in the sort (e.g., first). That is, the sort can be based on a query history. For example, a second set of predicted characters that when combined with the first set of characters of the portion of the query comprises a predicted phrase that appears more frequently in the query history of the user submitting the query and/or in the query history of a plurality of users can be ordered to appear earlier (e.g., first) in the sort.

The suggesting module 364 can include CRI that when executed by the processing resource 352 can propose at least a portion of the sorted predicted plurality of phrases for completing the query. Proposing the sorted predicted plurality of phrases can include causing the predicted plurality of phrases to be displayed to a user conducting the query. The predicted plurality of phrases can be caused to be displayed to the user in the order determined by the sort. The predicted plurality of phrases can be proposed to the user as selectable options in a drop down menu associated with a search bar displayed on a user interface.

Figure 4:
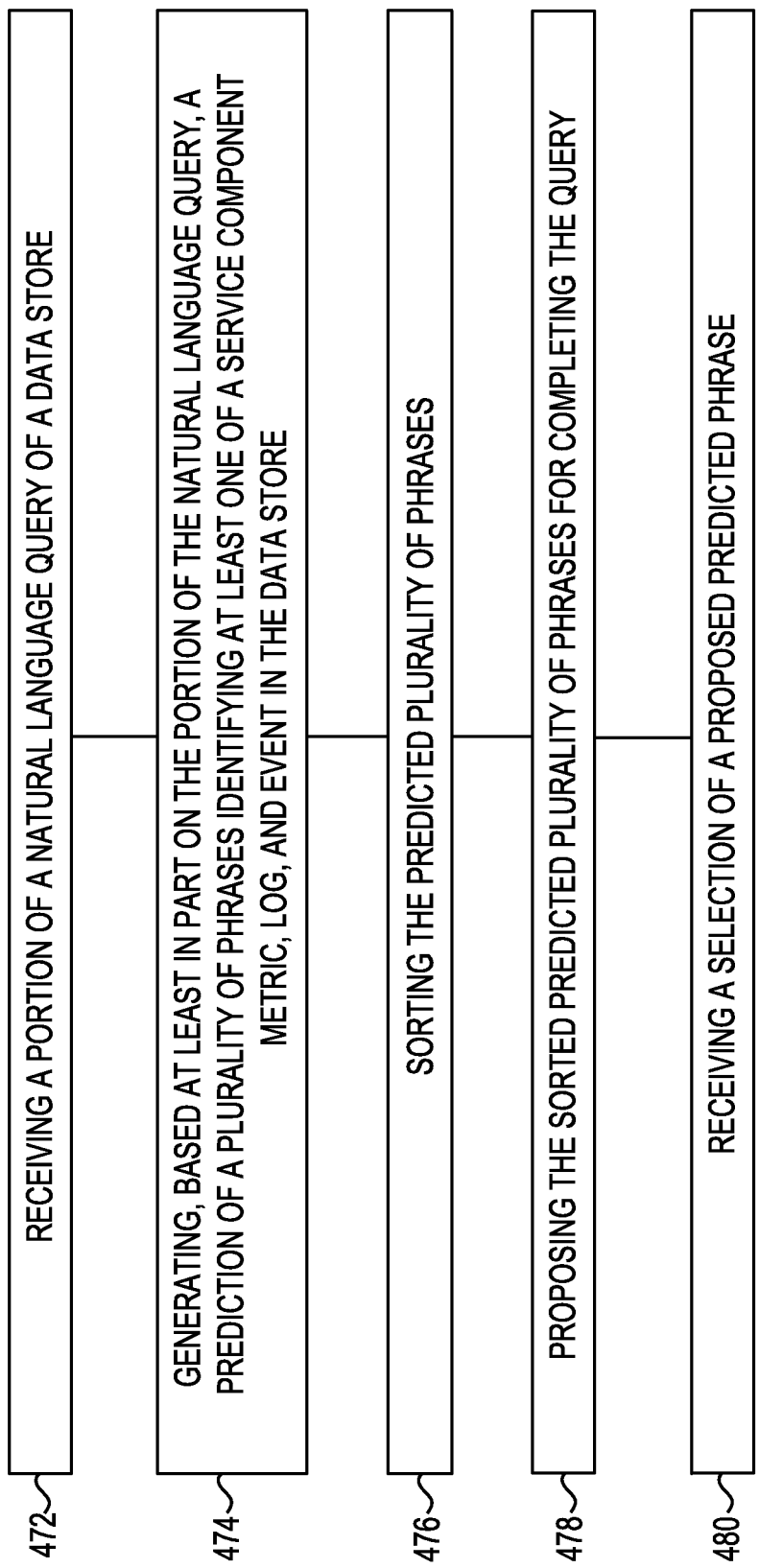
FIG. 4 is a flow chart of an example method for data store query prediction according to the present disclosure.

FIG. 4 is a flow chart of an example of a method 470 for predicting a data store query according to the present disclosure. Method 470 can be performed by a computing device (e.g., computing device 350, previously described in connection with FIG. 3), for instance.

At 472 the method 470 can include receiving a portion of a natural language query of a data store. The data store can include an operations management data store storing information related to a plurality of services. The portion of the query can include a first set of characters comprising an incomplete or complete phrase. A phrase can include one or more characters forming words and/or word parts. The characters can be incrementally received and analyzed to identify phrases. Some phrases can include keywords that ascribe specific structure to the query.

At 474 the method 470 can include generating, based at least in part on the portion of the natural language query, a prediction of a plurality of phrases identifying (e.g., matches meta information of, includes a key attribute of, contains a description implicating, etc.) at least one of a service component metric, a service component log, and a service component event included in the data store. This can include generating prediction of a second set of characters that, when combined with a first set of characters of the portion of the query, comprise completed predicted phrases.

The prediction of the plurality of phrases can be based on keywords. Keywords can include key attributes. A key attribute can include a phrase that identifies a specific instance of a service component metric, log, and/or event. For example, a key attribute can include a phrase identifying a specific instance of a specific service component of a specific service associated with a specific metric, log, and/or event.

Keywords can include key attribute indicating keywords. The key attribute indicating keyword can be "for." A phrase appearing after the key attribute indicating keyword can identify the key attribute. The key attribute can then be used to identify any service component metric, log, and/or event with a matching key attribute.

The predicted plurality of phrases can include a key attribute indicating keyword followed by a key attribute identifying an instance of at least one of a service component metric, a service component log, and a service component event included in the data store. That is, the predicted plurality of phrases can include the phrases indicating and identifying a key attribute that will specifically match a key attribute of a service component metric, a service component log, and a service component event within the data store. For example, if the user profile includes a user characteristic defining the area of responsibility of the user as router configuration and/or revealing that the last one hundred queried by the user were related to router configuration, then the predicted plurality of phrases can include a predicted key attribute indicating keyword and/or a predicted key attribute to complete the query, wherein the key attribute indicating keyword and/or a key attribute match a key attribute of a service component metric, log, and/or event that is specific to an instance of a router configuration metric, log, and/or event of a router configuration service.

At 476 the method 470 can include sorting the predicted plurality of phrases. The sorting can be based on a completed phrase in the portion of the query, a user profile, a query history, relationships, keywords, data analytics, outliers, phrase intersects, etc.

At 478 the method 470 can include proposing the sorted predicted phrases of the predicted plurality of phrases. Proposing the sorted predicted plurality of phrases can include causing the predicted plurality of phrases to be displayed to a user conducting the query. The predicted plurality of phrases can be caused to be displayed to the user in the order determined by the sort. The predicted plurality of phrases can be proposed to the user as selectable options in a drop down menu associated with a search bar displayed on a user interface.

At 480 the method 470 can include receiving a selection of a proposed predicted phrase of the predicted plurality of phrases. Receiving a selection of a proposed predicted phrase can include receiving the selection from a user. The user may select one of the proposed predicted phrases from a drop down box. The user can transmit the selection by selecting one of the proposed predicted phrases from a drop down box and/or by selecting a search initiating icon after selecting one of the proposed predicted phrases from a drop down box.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N", particularly with respect to reference numerals in the drawings, indicate that a number of the particular feature so designated can be included with a number of examples of the present disclosure. As used herein, "a" or "a number of" something can refer to one or more such things.

What is claimed:

1. A method, comprising:
    receiving a portion of a natural language query of a data store;
    generating, based at least in part on the portion of the natural language query, a prediction of a plurality of phrases identifying a service component metric of an information technology (IT) system, a service component log of the IT system, or a service component event of the IT system, wherein generating comprises:
        identifying an outlier indicator for the service component metric, the service component log, or the service component event, wherein the outlier indicator indicates irregular behavior specifically by the service component metric, the service component log, or the service component event that exceeds or falls below a baseline standard; and
        including the service component metric, the service component log, or the service component event with the outlier indicator in at least one of the plurality of phrases;
    sorting the predicted plurality of phrases to order the service component metric, the service component log, or the service component event with the outlier indicator earlier in a sort order than other service component metrics, service component logs, or service component events without the outlier indicator;
    proposing the sorted predicted plurality of phrases for completing the natural language query; and
    receiving a selection of a proposed predicted phrase of the proposed predicted plurality of phrases.

2. The method of claim 1, wherein the predicted plurality of phrases include a key attribute indicating keyword followed by a key attribute identifying an instance of a service component metric, a service component log, or a service component event included in the data store.

3. The method of claim 1, wherein the data store is an operations management data store storing information related to a plurality of services.

4. The method of claim 1, wherein generating the prediction of the plurality of phrases further comprises:
    determining a relationship between an IT service specified in the natural language query and a constituent service component of the IT service including referencing a topological mapping stored in a configuration management database (CMDB) to determine the constituent service component is associated with the IT service; and
    including the constituent service component of the IT service, a related service component metric of the constituent service component, a related service component log related of constituent service component, or a related service component event of the constituent service component in at least one of the predicted plurality of phrases.

5. The method of claim 4, wherein sorting comprises ordering the constituent service component, the related service component metric, the related service component log, or the related service component event earlier in the sort order than another service component metric, service component log, or service component event unrelated to the IT service specified in the natural language query.

6. The method of claim 1, wherein sorting comprises ordering a particular service component metric, service component log, or service component event that appeared more frequently in previous queries by a user earlier in the sort order than another service component metric, service component log, or service component event that appeared less frequently in the previous queries.

7. A non-transitory computer readable medium storing instructions executable by a processing resource to cause a computer to:
    receive a portion of a natural language query of a data store;
    generate, based at least in part on the portion of the natural language query, a prediction of a plurality of phrases identifying a service component metric of an information technology (IT) system, a service component log of the IT system, or a service component event of the IT system, wherein generation includes:
        identifying an outlier indicator for the service component metric, the service component log, or the service component event, wherein the outlier indicator indicates irregular behavior specifically by the service component metric, the service component log, or the service component event that exceeds or falls below a baseline standard; and
        including the service component metric, the service component log, or the service component event with the outlier indicator in at least one of the plurality of phrases;

sort the predicted plurality of phrases to order the service component metric, the service component log, or the service component event with the outlier indicator earlier in a sort order than other service component metrics, service component logs, or service component events without the outlier indicator;

propose the sorted predicted plurality of phrases for completing the natural language query; and receive a selection of a proposed predicted phrase of the proposed predicted plurality of phrases.

8. The non-transitory computer-readable medium of claim 7, wherein the predicted plurality of phrases include a key attribute indicating keyword followed by a key attribute identifying an instance of a service component metric, a service component log, or a service component event included in the data store.

9. The non-transitory computer-readable medium of claim 7, wherein the data store is an operations management data store storing information related to a plurality of services.

10. The non-transitory computer-readable medium of claim 7, wherein the instructions to generate the prediction of the plurality of phrases includes instructions to:

determine a relationship between an IT service specified in the natural language query and a constituent service component of the IT service including referencing a topological mapping stored in a configuration management database (CMDB) to determine the constituent service component is associated with the IT service; and include the constituent service component of the IT service, a related service component metric of the constituent service component, a related service component log related of constituent service component, or a related service component event of the constituent service component in at least one of the predicted plurality of phrases.

11. The non-transitory computer-readable medium of claim 10, wherein the instructions to sort include instructions to order the constituent service component, the related service component metric, the related service component log, or the related service component event earlier in the sort order than another service component metric, service component log, or service component event unrelated to the IT service specified in the natural language query.

12. The non-transitory computer-readable medium of claim 7, wherein the instructions to sort include instructions to order a particular service component metric, service component log, or service component event that appeared more frequently in previous queries by a user earlier in the sort order than another service component metric, service component log, or service component event that appeared less frequently in the previous queries.

13. A system comprising:
a processor; and
a non-transitory machine-readable medium storing instructions executable by the processor to:
generate, based at least in part on the portion of the natural language query, a prediction of a plurality of phrases identifying a service component metric of an information technology (IT) system, a service component log of the IT system, or a service component event of the IT system, wherein generation includes:

identifying an outlier indicator for the service component metric, the service component log, or the service component event, wherein the outlier indicator indicates irregular behavior specifically by the service component metric, the service component log, or the service component event that exceeds or falls below a baseline standard; and including the service component metric, the service component log, or the service component event with the outlier indicator in at least one of the plurality of phrases; and sort the predicted plurality of phrases to order the service component metric, the service component log, or the service component event with the outlier indicator earlier in a sort order than other service component metrics, service component logs, or service component events without the outlier indicator; and propose the sorted predicted plurality of phrases for completing the natural language query; and receive a selection of a proposed predicted phrase of the proposed predicted plurality of phrases.

14. The system of claim 13, wherein the predicted plurality of phrases include a key attribute indicating keyword followed by a key attribute identifying an instance of a service component metric, a service component log, or a service component event included in the data store.

15. The system of claim 13, wherein the data store is an operations management data store storing information related to a plurality of services.

16. The system of claim 13, wherein the instructions to generate the prediction of the plurality of phrases include instructions to:

determine a relationship between an IT service specified in the natural language query and a constituent service component of the IT service including referencing a topological mapping stored in a configuration management database (CMDB) to determine the constituent service component is associated with the IT service; and include the constituent service component of the IT service, a related service component metric of the constituent service component, a related service component log related of constituent service component, or a related service component event of the constituent service component in at least one of the predicted plurality of phrases.

17. The system of claim 16, wherein the instructions to sort include instructions to order the constituent service component, the related service component metric, the related service component log, or the related service component event earlier in the sort order than another service component metric, service component log, or service component event unrelated to the IT service specified in the natural language query.

18. The system of claim 13, wherein the instructions to sort include instructions to order a particular service component metric, service component log, or service component event that appeared more frequently in previous queries by a user earlier in the sort order than another service component metric, service component log, or service component event that appeared less frequently in the previous queries.

* * * * *